(12) United States Patent
Tok et al.

(10) Patent No.: US 9,066,108 B2
(45) Date of Patent: Jun. 23, 2015

(54) SYSTEM, COMPONENTS AND METHOD FOR PARAMETRIC MOTION VECTOR PREDICTION FOR HYBRID VIDEO CODING

(75) Inventors: Michael Tok, Berlin (DE); Alexander Glantz, Berlin (DE); Andreas Krutz, Berlin (DE); Thomas Sikora, Berlin (DE)

(73) Assignee: TECHNISCHE UNIVERSITAT BERLIN, Berlin (DE)

(*) Notice: Subject to any disclaimer, the term of this patent is extended or adjusted under 35 U.S.C. 154(b) by 596 days.

(21) Appl. No.: 13/452,364

(22) Filed: Apr. 20, 2012

(65) Prior Publication Data

US 2013/0279566 A1   Oct. 24, 2013

(51) Int. Cl.
  *H04N 7/12*     (2006.01)
  *H04N 11/02*    (2006.01)
  *H04N 11/04*    (2006.01)
  *G06K 9/00*     (2006.01)
  *H04N 19/54*    (2014.01)
  *H04N 19/52*    (2014.01)
  *H04N 19/61*    (2014.01)

(52) U.S. Cl.
  CPC ............ *H04N 19/54* (2014.11); *H04N 19/52* (2014.11); *H04N 19/61* (2014.11)

(58) Field of Classification Search
  USPC ........................................................ 375/240
  See application file for complete search history.

(56) References Cited

U.S. PATENT DOCUMENTS

| | | | |
|---|---|---|---|
| 6,353,678 B1 * | 3/2002 | Guo et al. ...................... 382/154 |
| 6,404,814 B1 * | 6/2002 | Apostolopoulos et al. ......................... 375/240.12 |
| 8,073,196 B2 | 12/2011 | Yuan et al. |
| 8,891,633 B2 * | 11/2014 | Zheludkov et al. ...... 375/240.26 |
| 2004/0207725 A1 * | 10/2004 | Fandrianto et al. ........ 348/14.13 |
| 2005/0163348 A1 * | 7/2005 | Chen ............................. 382/107 |
| 2006/0083440 A1 * | 4/2006 | Chen ............................. 382/284 |

FOREIGN PATENT DOCUMENTS

WO   2011/128272   10/2011

* cited by examiner

*Primary Examiner* — Sath V Perungavoor
*Assistant Examiner* — Talha Nawaz
(74) *Attorney, Agent, or Firm* — Barnes & Thornburg LLP

(57) ABSTRACT

Parametric Motion Vector Prediction (PMVP) methodologies and components and systems for performing those methodologies are provided to more effectively and efficiently encode video content that includes complex motion such as zoom or rotation. By substituting the PMVP for a collocated MVP used in HEVC in order to reduce the amount of bit rate increase required when including the PMVP analysis in the bit stream. Further, compression of the motion vectors is provided in a three stage approach based on transformation, quantization and difference coding.

15 Claims, 7 Drawing Sheets

SYSTEM, COMPONENTS AND METHOD FOR PARAMETRIC MOTION VECTOR PREDICTION FOR HYBRID VIDEO CODING

BACKGROUND

Disclosed embodiments are directed, generally, to systems, components and methods for encoding and decoding video data.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Disclosed embodiments provide a novel Parametric Motion Vector Predictor (PMVP) which utilizes higher-order motion models than those used in conventional motion prediction techniques to efficiently predict complex motion.

A disclosed embodiment provides a novel PMVP which utilizes higher-order motion models than those used in conventional motion prediction techniques to efficiently predict rotation.

A disclosed embodiment provides a novel PMVP which utilizes higher-order motion models than those used in conventional motion prediction techniques to efficiently predict zoom.

A disclosed embodiment utilizes an efficient compression scheme to compress the requisite motion models prior to transmission, wherein the compression scheme is based on transformation, quantization and difference coding.

BRIEF DESCRIPTION OF FIGURES

A more complete understanding of the present invention and the utility thereof may be acquired by referring to the following description in consideration of the accompanying drawings, in which like reference numbers indicate like features, and wherein:

FIGS. 1(a)-1(c) are illustrative diagrams that aid in the explanation of methods for deriving MVPs that are inserted in an MVP list of an HEVC in an HM 3.2 test model FIG. 1(a) illustrates the example wherein the reference derives three MVPs (left, top, collocated).

FIG. 1(b) illustrates the example wherein the collocated predictor is replaced by the parametric predictor PMVP (denoted "Method 1").

FIG. 1(c) illustrates the example wherein the spatial MVPs are merged to reduce bits for indexing (denoted "Method 2").

FIG. 2(a) illustrates the case in which the MV for a particular MB is predicted based on the MVs of neighboring MBs when the video data content corresponds to a smooth translation.

FIG. 2(b) illustrates the case in which the MV for a particular MB would need to be predicted based on the MVs of neighboring MBs when the video data content corresponds to complex motion, such as zoom.

FIG. 4(a) provides an illustrative chart depicting such bin distribution changes for the Stanford video data content test sequence.

FIG. 4(b) provides an illustrative chart depicting such bin distribution changes for the Waterfall video data content test sequence.

FIG. 4(c) provides an illustrative chart depicting such bin distribution changes for the Station video data content test sequence.

DETAILED DESCRIPTION

Figure 2B:
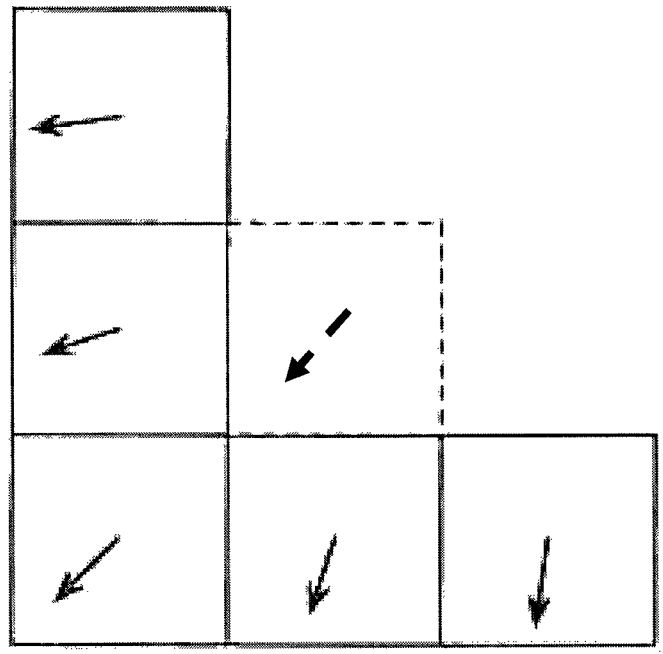
FIGS. 2(a)-2(b) are illustrative diagrams that aid in the explanation of the difficulty in predicting, and thus, compressing, video data content based on the presence of complex motion.

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Ever increasing resolution in video content requirements leads to ever increasing bandwidth requirements for transmission. As a result, joint standardization activities between ISO/IEC Moving Picture Experts Group (MPEG) and ITU-T Video Coding Experts Group (VCEG) began in April 2010 to formulate and gain acceptance of a new video coding standard for highly efficient video compression. The working title of that standard is High Efficiency Video Coding (HEVC) (see K. McCann, T. Wiegand, B. Bross, W.-J. Han, J.-R-Ohm, J. Ridge, S. Sekiguchi, and G. J. Sullivan, "HEVC DRAFT AND TEST MODEL EDITING," ITU-T SGI6 WP3 and ISO/IEC JTC1/SC29/WGII document JCTVC-D500-rl.doc, March 2011). HEVC, also known as H.265 and MPEG-H Part 2, is the successor to H.264/MPEG-4 AVC (Advanced Video Coding).

One main goal of HEVC is reduction of the average bit rate needed to transmit videos by about 50% in comparison to H.264/AVC (see T. Wiegand, G. J. Sullivan, G. Bjontegaard, and A. Luthra, "Overview of the H.264/AVC video coding standard," Circuits and Systems for Video Technology, IEEE Transactions on, vol. 1 3, no. 7, pp. 560-576, July 2003).

Thus, HEVC is meant to improve video quality and double the data compression ratio compared to H.264. Additionally, HEVC is meant to scale from 320×240 pixels to 7680×4320 pixel resolution. Benefits associated with implementation of HEVC also include improved picture quality in terms of noise level, color gamut and dynamic range.

Thus, HEVC aims to significantly improve coding efficiency thereby reducing bit rate requirements by half with comparable image quality. However, HEVC's improvements come with the added expense of increased computational complexity. Thus, design of HEVC compliant components, systems and methodologies requires balancing computational complexity, compression rate, robustness to errors and processing delay time.

In implementation, HEVC replaces macroblocks with a flexible scheme based on Coding Units (CUs), which are variable size structures which sub-partition a frame into rectangular regions. Each CU contains variable-block-sized Prediction Units (PUs) of either intra-frame or inter-frame prediction type, and Transform Units (TUs) which contain coefficients for spatial block transform and quantization.

Conventionally, the main improvements proposed for HEVC have focused on using the CUs (i.e., larger quad tree-based blocks) that replace the former macroblocks (MB), using larger transform sizes, implementing improved motion vector prediction schemes, better interpolation filters, and implementation of an optional adaptive loop filter based on Wiener filtering.

However, in implementation of HEVC compliant components, motion compensated inter prediction is the main technique for temporal redundancy reduction; this is because motion compensated inter prediction is utilized in all the modern hybrid video codecs. In motion compensated inter prediction, a Motion Vector (MV) is generated for each inter block using block motion estimation techniques to describe the position of a similar block located in already decoded frames.

The MV field, which results from such block-wise motion estimation, is highly redundant because the motion of adjacent blocks is very similar. This means, that, generally speaking, these MVs can be predicted from MVs of already coded, surrounding Motion Blocks (MBs).

There are many different ways to derive such motion vector predictors (MVPs). Thus, many different methods and MVPs are known and have been evaluated during the HEVC standardization process (see B. Bross, J. Jung, Y.-W. Huang, Y. H. Tan, I.-K. Kim, T. Sugio, M. Zhou, T. K. Tan, E. F. K. Kazui, W.-J. Chien, S. Sekiguchi, S. Park, and W. Wan, "Bog report of ce9: My coding and skip/merge operations," ITU-T SG16 WP3 and ISO/IEC JTC1/SC29/WG11 document JCTVC-E481-r2, March 2011).

For example, one test model (HM 1.0) was designed to use five different types of MVPs. However, during development of subsequent versions, the number of MVP types was reduced to reduce the computational complexity without any significant loss in compression efficiency. A great advantage of MVP is that each MV can be represented by a prediction error solely. These errors are much smaller in amplitude; accordingly, the errors can be compressed more efficiently than raw data. However, a disadvantage to MVP is that the selection of a specific MVP must be indicated somehow in a transmitted signal including the video content. Thus, for example, HEVC encodes one MVP index per MV.

Motion compensated prediction is the most common technique for redundancy reduction in modern hybrid video codecs. However, the resulting MV fields are highly redundant as well. Thus, motion vector prediction and difference coding are used for compression.

Figures 1A, 1B, 1C:
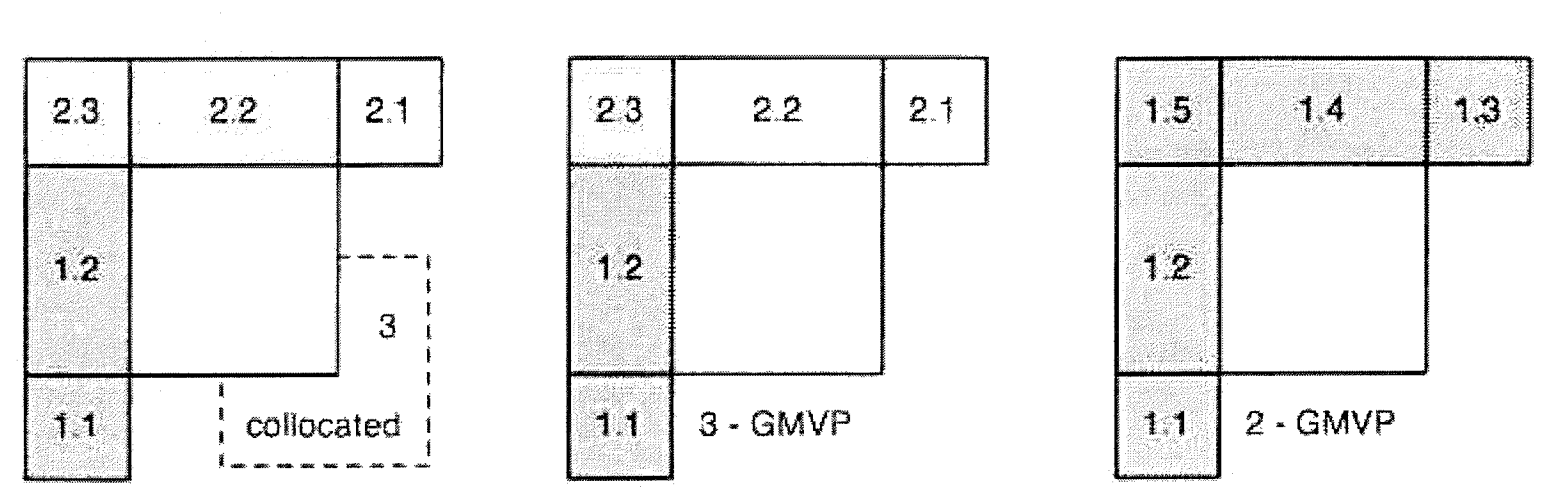

As explained in Bross et al., the third draft of HEVC utilizes three motion vector predictors. In addition to two spatial predictors, derived from previously coded blocks on top and left side of each block to be coded, a so called collocated predictor is introduced. This predictor derives motion vectors from previously coded frames. FIG. 1(a) illustrates how these three MVPs are obtained. FIGS. 1(a)-1(c) are illustrative diagrams that aid in the explanation of methods for deriving MVPs that are inserted in an MVP list of an HEVC in an HM 3.2 test model. Thus, FIG. 1(a) specifically illustrates the example wherein the reference derives three MVPs (left, top, collocated).

To send the real motion vectors for all MBs to the decoder, only the prediction errors and an index, signaling which predictor is used, have to be transmitted.

However, all conventional MVP schemes used for HVEC compliant video coding have one assumption in common. The motion of neighboring blocks is assumed to be very similar; as a result, the corresponding MVs for blocks are similar as well. This assumption works well for smooth translational motion, but fails, when higher order motion or complex motion occurs. Examples of such complex motion include zoom and rotation.

Nevertheless, HEVC's spatial predictors exploit the smooth change of motion between neighboring blocks typically present within a frame. This works well for translational motion, but is suboptimal for zooming, rotation and all kind of mixtures of complex camera motion. The problem of deriving a motion vector field for zoom is illustrated in FIGS. 2(a)-(b).

Figure 2A:
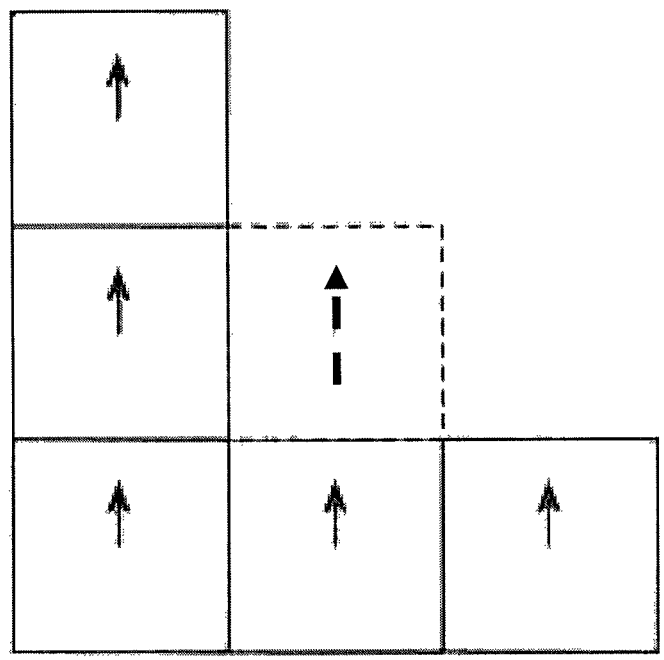

FIGS. 2(a)-(c) provide illustrative diagrams provided to aid discussion of the problem of deriving a MV field for complex motion such as zoom. In FIG. 2(a), motion is depicted for a smooth translation, wherein the MV for the dashed MB can be reliably estimated or interpolated based on MVs of neighboring MBs. However, in FIG. 2(b), the complex motion (e.g., zoom) experienced in the MBs around the dashed MB eliminate the possibility of reliably using the MVs for the neighboring MBs to determine the MV for the dashed MB.

To overcome this issue. a collocated predictor is used in HEVC; this approach works well as long as motion does not change over time. However, such changes occur often, for example, when a sequence of frames is captured as video content recorded using a handheld camera or when zooming or rotation in a sequence changes over time. In such situation, all common predictors proposed and used in combination with the HEVC standard are deficient.

In accordance with the disclosed embodiments, Parametric Motion Models (PMM) can be used to model and describe these types of motion. PMMs include of a set of parameters that describe complex motion between adjacent frames. Transformation may be performed using perspective 8 parameter models. Such models can be used to precisely describe complex motion, which is often observed in macroblocks assigned to background regions. These models H describe the transformation of pixel or macroblock positions $p=(x,y)^T$ of one frame as corresponding to positions in adjacent frames $p'=(x',y')^T$ by $$\begin{pmatrix} x' \cdot w' \\ y' \cdot w' \\ w' \end{pmatrix} = H \cdot \begin{pmatrix} x \\ y \\ 1 \end{pmatrix} \quad (1)$$

where H contains the 8 perspective transformation parameters $$H = \begin{pmatrix} m_0 & m_1 & m_2 \\ m_3 & m_4 & m_5 \\ m_6 & m_7 & 1 \end{pmatrix}. \quad (2)$$

In this way a parametric MV may be calculated for each macroblock position p in a frame.

$$V_p = p' - p \quad (3)$$

Thus, by adding such PMMs to a video datastream, an additional parametric MVP is available. Further, by concatenating the PMMs of adjacent frames, MVPs for different reference indices, and thus, for different reference frames, may be derived. As a result, the necessary bits required for transmitting MV prediction errors can be reduced. However, this implementation requires that the use of the PMVP be signaled using an MVP index, which actually increases the amount of bits for transmission.

As a result, in accordance with at least one embodiment, instead of adding the PMVP as a fourth predictor, the collocated predictor may simply be replaced (see FIG. 1(b); denoted as "Method 1") by the PMVP.

Additionally, Method 1 may be further varied by a further index bit reduction, wherein both spatial predictors are merged (see FIG. 1(c); denoted as "Method 2")

For the purposes of quantization, it has been determined that a step size for the corner motion vectors of 1/32 provides an acceptable balance between bit rate and model quality.

Various parametric motion estimation methods may be used to obtain a PMM that describes the complex transformations induced by camera motion. For example, the PMM may be provided using the parametric motion estimation method presented in M. Tok, A. Glantz, A. Krutz, and T. Sikora, "Feature-Based Global Motion Estimation Using the Helmholtz Principle," in Proceeding s of the IEEE International Conference on Acoustics Speech and Signal Processing, Prague, Czech Republic, May 2011. Thus, for each frame, 400 features may be selected and tracked by KLT-feature-tracking.

Subsequently, a robust estimator based on the Helmholtz principle may be applied on the set of feature correspondences to reject outliers resulting from foreground motion and mistracking and derive a precise PMM.

This estimator may take m randomly selected subsets of two correspondences to generate one simplified four parameter motion model $H_k$ per subset $$H_k = \begin{pmatrix} \tilde{m}_{0,k} & \tilde{m}_{1,k} & \tilde{m}_{2,k} \\ -\tilde{m}_{1,k} & \tilde{m}_{0,k} & \tilde{m}_{3,k} \\ 0 & 0 & 1 \end{pmatrix}. \quad (4)$$

This model $H_k$ may then be used to define whether a feature correspondence of the whole set is an inlier or an outlier with reference to $H_k$. With the number of inliers $N_k$ and the estimated error variance of these inliers $\sigma_k$, a rating per subset may be defined by $$\Phi_k = \frac{N_k}{\sigma_k} \quad (5)$$

A final perspective PMM may then be calculated by Least Squares for only the inlier features $\tilde{X}_k$ and their tracked correspondences $\tilde{x}_k$ with the largest $\Phi_k$. This final perspective PMM may be $$h = (A_k^T A_k)^{-1} A_k^T \tilde{x}_k, \quad (6)$$

where $A_k$ is the perspective design matrix for the feature correspondences of the kth consensus set and $h = (m_0 \ldots m_7)^T$ contains the final motion parameters.

Turning to motion model compression techniques, it should be appreciated from the above-description that a single PMM consists of 8 parameters, each represented by a 32 bit single precision floating point value. As a result, each frame would require transmission of an additional 256 bit to derive GMVPs at the decoder-side post transmission. Such transmission requirements are prohibitive because the requirements translate to 6.4 kbit/s more data for a 25 Hz sequence. Thus, there is utility in efficient compressing the PMMs prior to transmission.

Figure 3:
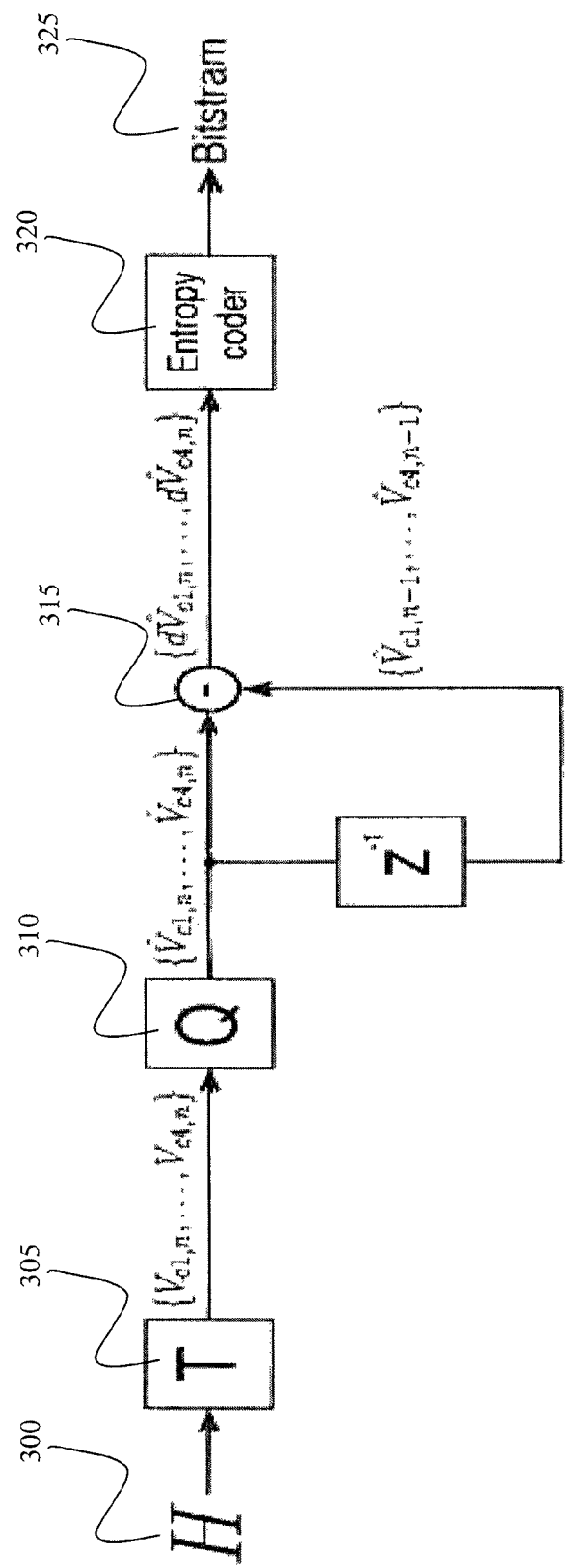
FIG. 3 provides an operation methodology diagram showing one example of a method for lossy perspective motion model compression provided in accordance with disclosed embodiments.

Accordingly, at least one disclosed embodiment efficiently transmits the PMMs using a PMM compression scheme based on a three stage approach wherein transformation, quantization and temporal difference coding are used. FIG. 3 provides an operation methodology diagram showing one example of a method for lossy perspective motion model compression provided in accordance with disclosed embodiments.

Since the parameters $m_0, \ldots, m_7$ are highly correlated and have different ranges of value and because the two perspective parameters $m_6$ and $m_7$ are quite sensitive to quantization, each PMM may be transformed to a set of four corner MVs at the positions $(\pm X_{res}/2, Y_{res}/2)^T$, using operations represented by equations (1) and (3).

This set of four corner MVs may be more robust to quantization and may easily be transformed back to a perspective model at the decoder side following transmission. Additionally, each MV may be highly correlated with its temporal predecessor so that differential coding in combination with exponential Golomb coding may be used for redundancy reduction.

Accordingly, as shown in FIG. 3, an entire coding process for compressing the PMMs is provided. This process is performed using component resident within an encoder (e.g., a compressor, as explained with reference to FIG. 5) and performed prior to transmission taking place to produce the bit stream that is ultimately transmitted and received on the decoder side (explained with reference to FIG. 5). The process begins at 300; subsequently, a homography H (i.e., an invertible transformation from a projective space; also referred to in the art as a collineation, projective transformation, and projectivity) for each video data content frame n is transformed to the four corner MVs $V_{c1,n}$ to $V_{c4,n}$ at 305. Subsequently, at 310, the four corner MVs are quantized to the set of vectors $\hat{V}_{c1,n}$ to $\hat{V}_{c4,n}$. Next, control proceeds to 315, at which the differences $d\hat{V}_{c1,n}$ to $d\hat{V}_{c4,n}$ between these vectors and their temporal predecessor $\hat{V}_{c1,n-1}$ to $\hat{V}_{c4,n-1}$ taken and entropy coded by exponential Golomb coding 320. Subsequently, control proceeds to 325, at which the entropy coded differences are written into the bit stream. Control then proceeds to subsequent operations wherein the compression operations end and equipment (e.g., transceiver that may be separately or jointly implemented in the same components for performing encoding and compression) for transmitting the bit stream is used to transmit the bit stream included in a transmission signal.

The following evaluation of the PMVP technique is provided merely as evidence of the utility of the disclosed embodiments. As a result, it should be understood that the evaluation parameters and methodologies are not limiting in any way to the disclosed embodiments.

Evaluation of the utility and efficacy of the disclosed embodiments can be provided in any number of ways including incorporating the PMVP into a HEVC test model HM 3.2 (see McCann et al.) to replace the collocated one (as explained above). As an additional, optional, implementation modification, the spatial MVPs may be combined into a single MVP for MVP index reduction (as explained above).

Table I provides an overview of the parameter settings used for one such experimental evaluation.

Tables II(a) and II(b) similarly provides an overview of the test sequences resolutions and the corresponding coding gains in terms of BD-rates for two different QP-ranges (see G. Bjontegaard, "Calculation of average PSNR differences between RD-curves," ITU-T SGI6/Q6 VCEG document VCEG-M33, March 2001).

As should be recognized from review of the data incorporated in the Tables, the range for lower quality has been selected as the QP range for the I-Slice of {22, 27, 32, 37}; similarly, as a high quality range, the QP range for the I-Slice{22, 27, 32, 37} are evaluated.

The data incorporated in the Tables appears to indicate that the PMVP is not as effective for sequences with lower resolutions having fewer coding units (e.g., Stefan and Waterfall) as the PMVP is effective for high resolution sequences (e.g., City, Blue Sky or Station). Additionally, for Stanford, even losses of up to 0.19% for Method 1 and 0.44% for Method 2 were observed.

To analyze effect of the novel PMVP and lossy compression on the bit rate differences, the data of the Tables for the disclosed embodiments may be compared with a reference encoder. This may be performed by counting and comparing the distribution of all bins of corresponding bit streams prior to the arithmetic coding by Context-based Adaptive Binary Arithmetic Coding (CABAC; D. Marpe, H. Schwarz, and T. Wiegand, "Context-based adaptive binary arithmetic coding in the H.264/AVC video compression Standard," IEEE Transactions on Circuits and Systems for Video Technology, vol. 13, no. 7, pp. 620-636, July 2003).

Figure 4A:
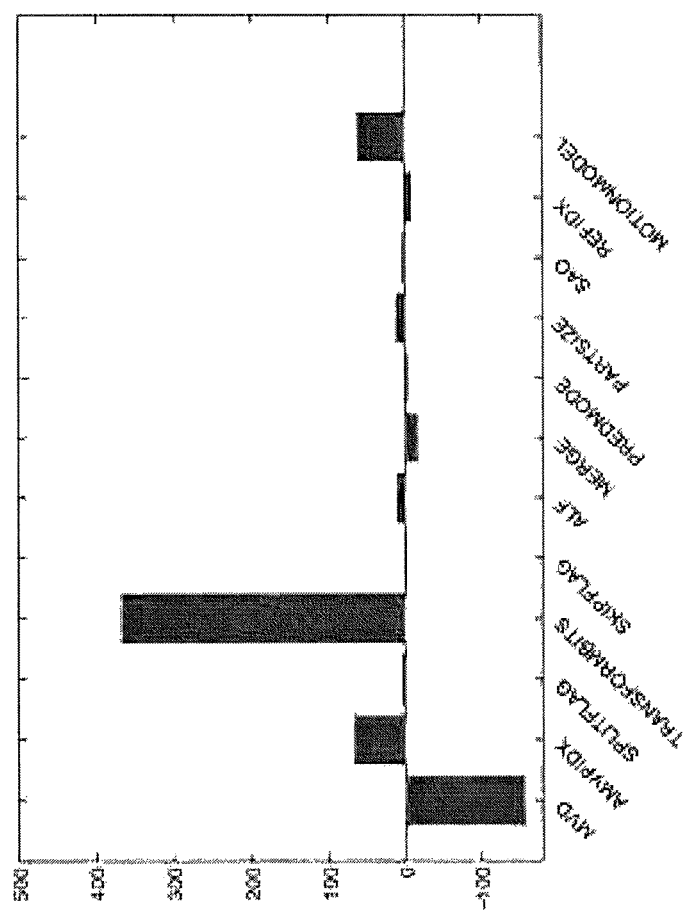
FIGS. 4(a)-4(c) provide illustrative charts graphically depicting bin distribution changes in per frame bin distribution between a HM 3.2 (HEVC test model version 3.2) test module incorporating a conventional MVP and Method 1 at QP (quantization parameter) 22 for three representative video data content test sequences.
Figure 4B:
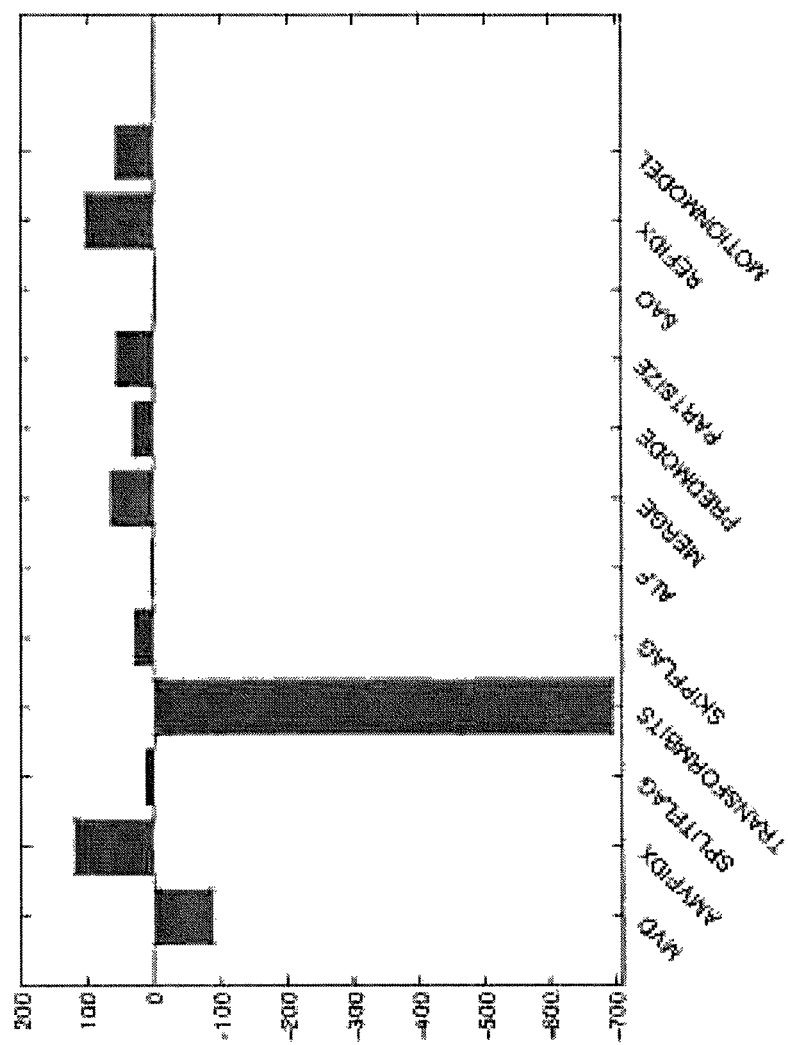
Figure 4C:
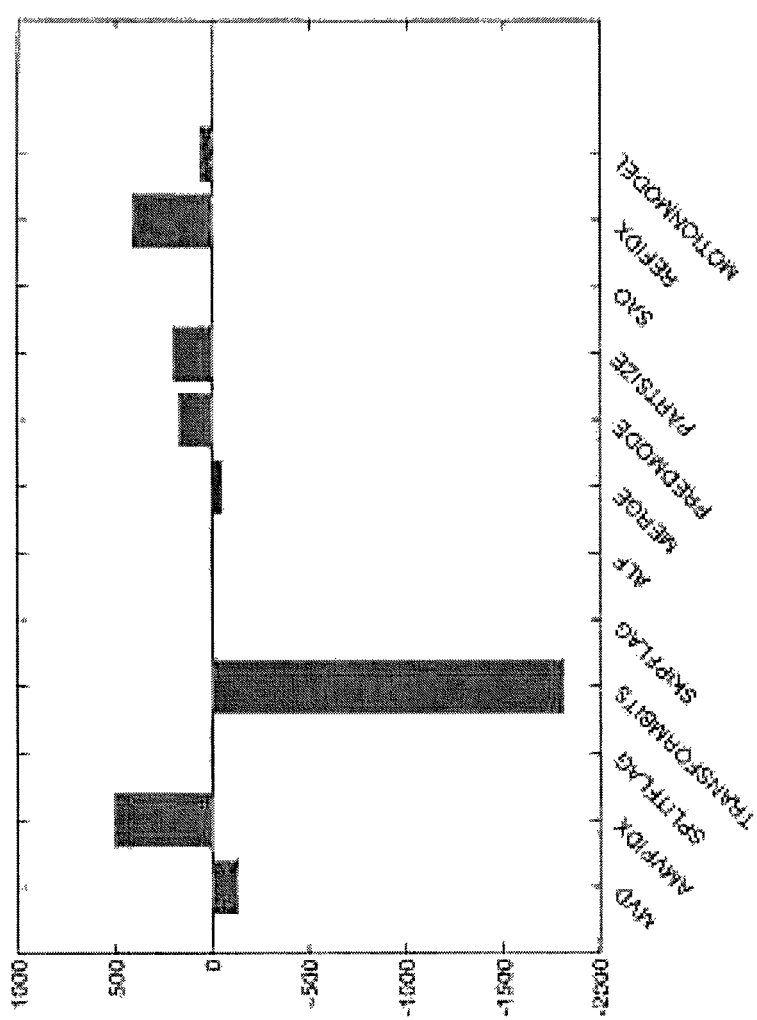

FIGS. 4(a)-4(c) provide illustrative charts graphically depicting bin distribution changes in per frame bin distribution between a HM 3.2 test module incorporating a conventional MVP and Method 1 at QP 22 for three representative video data content test sequences. FIG. 4(a) provides an illustrative chart depicting such bin distribution changes for the Stanford video data content test sequence. FIG. 4(b) provides an illustrative chart depicting such bin distribution changes for the Waterfall video data content test sequence. FIG. 4(c) provides an illustrative chart depicting such bin distribution changes for the Station video data content test sequence.

As should be recognized from review of those figures, the bin distributions are significantly effected when the conventional, collocated MVP is replaced by the PMVP in the HM 3.2. Each of FIGS. 4(a)-(c) provide a graphical representation of the following data: the motion vector difference bins (MVD), the number of bins needed for signaling the MVP index (AMVPIDX), the number of bins needed to encode the quadtree structure of each CU (SPLITFLAG), and the number of bins needed by the adaptive loop filter of HM 3.2 (ALF).

Likewise, because conventional techniques for merging allow the fusion of neighboring CUs in HEVC, for signaling such a fusion, additional bins may be needed for that data in view of the changes stemming from the PMVP. Thus, the evaluation data illustrated in FIGS. 4(a)-(c) also illustrates the amount difference for these bins (MERGE). Likewise, prediction mode signaling bins are represented by PREDMODE and the number of requisite bins for description of the shape of the final Inter prediction units (PARTSIZE).

Optionally, a sample adaptive offset tool may be incorporated into the HM 3.2 as an additional in-loop-filter to determine the PMVPs effects on such filters. The number of bins required by that filter is represented as SAO; likewise, the number of bins required to select certain reference frames for the Inter prediction is represented as REFIDX.

Thus, as can be readily understood from FIG. 4(a), for those sequences in which more bits are used for transformation coefficients (e.g., Stanford), implementation of the PMVP leads to a higher required bit rate. This increase results from MVPs that do not as effectively fit the video motion as the reference HM 3.2 MVP set does. However, for those sequences wherein the main motion is complex motion such as zoom (e.g., Station illustrated in FIG. 4(b) and Waterfall sequence illustrated in FIG. 4(c)), the PMVP delivers highly precise MVPs for all reference frames used for prediction. Thus, by using a few more bits for reference indexing, the PMVP achieves much higher quality prediction signals for the Inter mode. As a result, there is less of need to transmit transformation coefficients, which leads to bit rate reductions that may offset the increased reference indexing bit transmission requirements.

It should also be noted that the City sequence (not shown in FIGS. 4(a)-(c) but data presented in Tables II(a) and (b)) is video content acquired through the use of a handheld camera; as a result, the motion depicted in this video sequence consists of arbitrary combinations of zoom and rotation. Accordingly, use of the PMVP appears to provide as much as 2.42% in bit rate reductions.

Further, it may be appreciated that techniques and operations associated with Method 2 (see FIG. 1(c) and discussed above) appears to be more well suited for sequences with a high amount of zoom and rotation because the requisite bits for MVP signaling decrease because of the reduced number of MVP indices. To the contrary, a merged spatial MVP may not be particularly efficient for other kinds of motion as evidenced by the increased loss for the Stanford sequence when changing from implementation Method 1 to Method 2 (see Tables II(a) and (b)).

Additionally, there may be a reduction in gain for lower QP values because lower QP values correspond with an increased amount of Intra blocks; as a result of that increase, there is a decreased amount of MVs for the Inter blocks. However, by adding MVPs based on PMMs, gains of up to 2.42% for sequences with complex motion may be possible. Accordingly, implementation and customization of the PMVP methodology may have significant potential for improving motion vector prediction for video content having complex motion.

Moreover, it should be appreciated that the novel PMVP enables prediction of highly complex motion but may not be as beneficial or necessary for simple translational motion. Thus, for video data sequences with motion effectively handled by conventional MVPs, an adaptive decision technique for using or not using PMVP could reduce or avoid bit rate losses. Accordingly, in accordance with at least one embodiment, a decision may be made on a per frame basis as to whether the PMVP approach is implemented or a conventionally well known and available MVP is used. By providing this analysis and tailored motion vector prediction, the hybrid video coding methodologies may provide further gains. Thus, in one potential implementation of this approach, PMM analysis may be performed and an indication of whether PMVPs should be used for coding a frame or not may be included in the signaling.

Research indicates that use of the novel PMVP in conjunction with HEVC compression will significantly improve the effectiveness of the HEVC compression. Specifically, incorporation of the PMVP into a HEVC test model HM 3.2 indicates that gains of up to 2.42% can be achieved.

Figure 5:
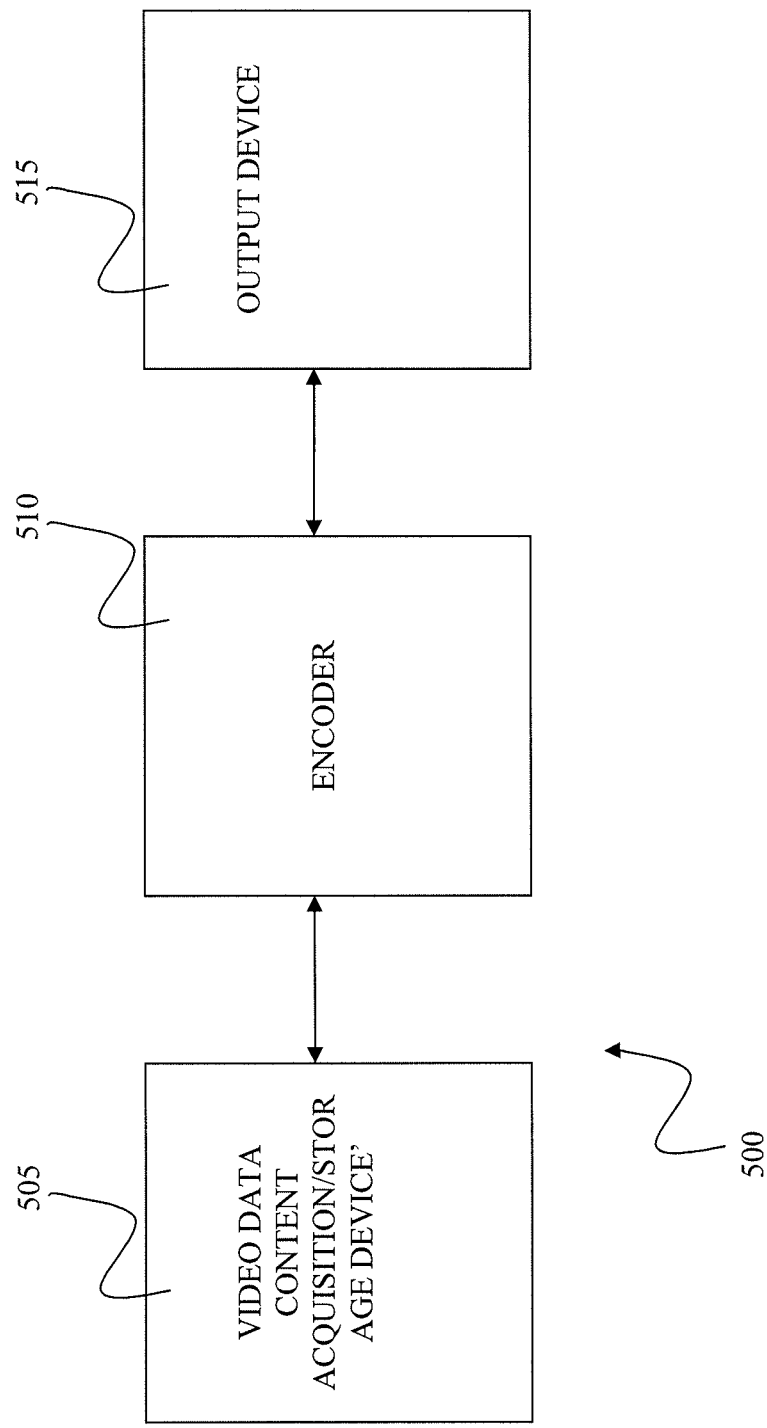
FIG. 5 is an illustrative example of various components and system equipment that may be configured to utilize the methodologies of the disclosed embodiments.

Thus, in implementation, disclosed embodiments may provide novel PMVPs utilize higher-order motion models than those used in conventional motion prediction techniques to efficiently predict rotation. FIG. 5 is an illustrative example of various components and system equipment that may be configured to utilize the methodologies of the disclosed embodiments.

Accordingly, as shown in FIG. 5, a video content system 500 includes a video content acquisition device 505 coupled to an encoder 510 and an output device 515. The video content acquisition device may be a video camera for acquiring video content or memory storing previously acquired content. That video content may be input into the encoder to perform parametric motion vector prediction as disclosed in the embodiments that provide a novel PMVP, which utilizes higher-order motion models than those used in conventional motion prediction techniques to efficiently predict complex motion. Accordingly, such components may utilize this efficient compression scheme to compress the requisite motion models prior to transmission of data, wherein the compression scheme is based on transformation, quantization and difference coding. By incorporating, this predictor into the HEVC test model HM 3.2 gains of up to 2.42% may be achieved.

The encoder 510 may run one or more video codecs including or utilizing the disclosed PMVP compression scheme disclosed above along with other motion compensated inter prediction schemes.

Thus, as discussed above, video data content compression techniques optimally use various coding techniques to reduce redundancy in video data content. These techniques usually include a combination of spatial image compression and temporal motion compensation, wherein the majority of video compression algorithms use lossy compression to eliminate large amounts of data while maintaining perceived image quality. As recognized in the art, there is an ongoing balance between video quality, cost of processing the compression and decompression, and system requirements, wherein highly compressed video or video compressed using computationally simplistic approaches may present visible or distracting artifacts.

Other factors that require consideration include the required computational complexity of the encoding and decoding algorithms, the level of robustness to data losses and errors, ease of editing, random access, end-to-end transmission or output delay, etc. Thus, the HEVC standard is directed at improving coding efficiency compared to its predecessor, the AVC High Profile. Based on the balancing of various factors, HEVC does this by reducing bit rate requirements by half with comparable image quality but at the expense of increased computational complexity.

These types of compression techniques are used prior to output of the video content whether it be to a particular piece of equipment for output to users or it be a transceiver or transmitter that further transmits the video content to other equipment. Thus, as part of video content encoding, the digital video content is encoded to meet specified formats and specifications for recording, playback and/or transmission through the use of video encoder software. As a result, video encoding techniques, and the proper selection thereof, significantly contribute to the image quality for the resulting video content. Accordingly, it should be understood that some or all of the components illustrated in FIG. 5 may be implemented within video content and DVD systems (players, recorders), satellite and digital terrestrial broadcast system components including encoders/decoders, or a variety of digital devices and software products with video recording and/or playing capability including mobile phones and other Personal Data Assistants (PDAs). Additionally, the disclosed embodiments may be implemented in general or special purpose computers running software to perform encoding of video data to be made available on the Internet or other public and private communication networks.

While this application has described innovation in conjunction with the specific embodiments outlined above, it is evident that many alternatives, modifications and variations will be apparent to those skilled in the art. Accordingly, the various embodiments, as set forth above, are intended to be illustrative, not limiting. Various changes may be made without departing from the spirit and scope of innovation.

For example, the innovation is not limited to encoding newly acquired video content data but may be used to reduce redundancy in previously stored video content data to further reduce the size or improve the quality of such data. Furthermore, the disclosed PMVP may be paired to be used in combination with various conventionally known methodologies, components and systems for predicting non-complex motion.

Additionally, it should be understood that the functionality described in connection with various described components of various embodiments may be combined or separated from one another in such a way that the architecture or structure is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative orders and/or simultaneously.

Further, various disclosed components may be provided in alternative combinations operated by, under the control of or on the behalf of various different entities or individuals. It should also be understood that, in accordance with at least one embodiment, system components may be implemented together or separately and there may be one or more of any or all of the disclosed system components. Further, system components may be either dedicated systems or such functionality may be implemented as virtual systems implemented on general purpose equipment via software implementations.

As a result, it will be apparent for those skilled in the art that the disclosed embodiments are only examples and that various modifications can be made within the scope of the appended claims.

TABLE I

| | |
|---|---|
| HEVC test software | HM 3.2 |
| Profile | High efficiency |

TABLE I-continued

| Picture order/GOP settings | IBBB (hierarchical QP) |
|---|---|
| QP-low | ∈ {22, 27, 32, 37} |
| QP-high | ∈ {17, 22, 27, 32} |
| Largest CU size | 64 × 64 |
| Smallest CU size | 8 × 8 |
| Number of reference frames | 4 |
| Motion search range | 64 × 64 |

TABLE II(a)

| | | Method 1 | | | |
|---|---|---|---|---|---|
| | | QP-low | | QP-high | |
| Sequence | Resolution | BD [%] | BD-PSNR [dB] | BD [%] | BD-PSNR [dB] |
| Stefan | 352 × 240 | −0.26 | 0.01 | −0.20 | 0.01 |
| Waterfall | 704 × 480 | 0.09 | 0.00 | −0.30 | 0.01 |
| Stanford | 720 × 480 | 0.19 | 0.00 | 0.16 | −0.01 |
| City | 1280 × 720 | −1.77 | 0.05 | −1.54 | 0.04 |
| Blue Sky | 1920 × 1080 | −0.20 | 0.01 | −0.07 | 0.00 |
| Station | 1920 × 1080 | −1.94 | 0.05 | −1.59 | 0.02 |
| Average | | −0.82 | 0.02 | −0.74 | 0.01 |

TABLE II(b)

| | | Method 2 | | | |
|---|---|---|---|---|---|
| | | QP-low | | QP-high | |
| Sequence | Resolution | BD [%] | BD-PSNR [dB] | BD [%] | BD-PSNR [dB] |
| Stefan | 352 × 240 | −0.11 | 0.01 | −0.06 | 0.00 |
| Waterfall | 704 × 480 | 0.01 | 0.00 | −0.50 | 0.01 |
| Stanford | 720 × 480 | 0.44 | −0.01 | 0.32 | −0.01 |
| City | 1280 × 720 | −2.42 | 0.07 | −1.99 | 0.06 |
| Blue Sky | 1920 × 1080 | −0.36 | 0.01 | −0.17 | 0.01 |
| Station | 1920 × 1080 | −2.36 | 0.06 | −2.11 | 0.03 |
| Average | | −1.05 | 0.02 | −0.97 | 0.02 |

The invention claimed is:

1. An encoder for performing hybrid video encoding of video data content, wherein a plurality of Parametric Motion Models (PMMs) are used to model and describe complex motion in the video data content, wherein, the plurality of PMMs each includes a set of parameters that describe complex motion between adjacent frames within the video data content, the encoder being configured to:
   receive the video data content from a video data acquisition or storage device;
   perform a transformation of the video data content using the plurality of PMMs to describe complex motion between adjacent frames by calculating a parametric motion vector for each macroblock position in each frame in the video data content;
   quantize the transformed video data content to predict a plurality of corner motion vectors;
   determine differences between the plurality of corner motion vectors and corresponding temporal predecessors;
   entropy encode the determined differences for the plurality of corner motion vectors;
   compress the plurality of PMMs; and
   writing the entropy coded differences into a bit stream along with the data indicating the plurality of compressed PMMs for output,
   wherein, the parametric motion vector prediction is performed utilizing higher-order PMMs to predict complex motion.

2. The encoder of claim 1, wherein the prediction of the complex motion includes prediction of rotation within the video data content.

3. The encoder of claim 1, wherein the prediction of the complex motion includes prediction of zoom within the video data content.

4. The encoder of claim 1, wherein the encoder further determines motion vector predictors for different reference indices and different reference frames by concatenating a plurality of PMMs of adjacent frames within the video data content thereby reducing a requisite number of bits required for transmitting motion vector prediction errors.

5. The encoder of claim 1, wherein the encoder replaces a collocated predictor provided according to the HEVC standard with a parametric motion vector predictor.

6. The encoder of claim 1, wherein the encoder performs a further index bit reduction, wherein both spatial predictors are merged.

7. The encoder of claim 1, wherein, for the purposes of quantization, a step size of 1/32 is selected for predicting the corner motion vectors.

8. The encoder of claim 1, wherein, following determination of the plurality of PMMs, outliers resulting from foreground motion and mistracking are rejected to further improve precision of the plurality of PMMs.

9. The encoder of claim 8, wherein rejection of outliers in the plurality of PMMs is performed on a set of generated feature correspondences based on the Helmholtz principle to define whether a feature correspondence of a whole set is an inlier or an outlier.

10. The encoder of claim 1, wherein entropy encoding of the vector differences is performed using Golomb coding.

11. The encoder of claim 1, wherein a least squares analysis is performed for only inlier features and specific tracked feature correspondences.

12. The encoder of claim 1 included in an encoding system which further comprises a transceiver that receives the bit stream and transmits the bit stream and wherein the data indicating the compressed plurality of PMMs includes a motion vector index to signal which predictor has been used to encode the video data content.

13. The encoder of claim 1, wherein the transformation uses perspective 8 parameter models.

14. A method of performing hybrid video encoding of video data content, wherein a plurality of Parametric Motion Models (PMMs) are used to model and describe complex motion in the video data content, wherein, the plurality of PMMs each includes a set of parameters that describe complex motion between adjacent frames within the video data content, the method comprising:
   receiving the video data content from a video data acquisition or storage device;
   performing a transformation of the video data content using the plurality of PMMs to describe complex motion between adjacent frames by calculating a parametric motion vector for each macroblock position in each frame in the video data content;
   quantizing the transformed video data content to predict a plurality of corner motion vectors;
   determining differences between the plurality of corner motion vectors and corresponding temporal predecessors;
   entropy encoding the determined differences for the plurality of corner motion vectors;

compressing the plurality of PMMs; and writing the entropy coded differences into a bit stream along with the data indicating the plurality of compressed PMMs for output, wherein, the parametric motion vector prediction is performed utilizing higher-order PMMs to predict complex motion.

15. The method of claim 14, further comprising receiving the bit stream and transmitting the bit stream via a transceiver, wherein the data indicating the compressed plurality of PMMs includes a motion vector index to signal which predictor has been used to encode the video data content.

* * * * *